Patented May 3, 1927.

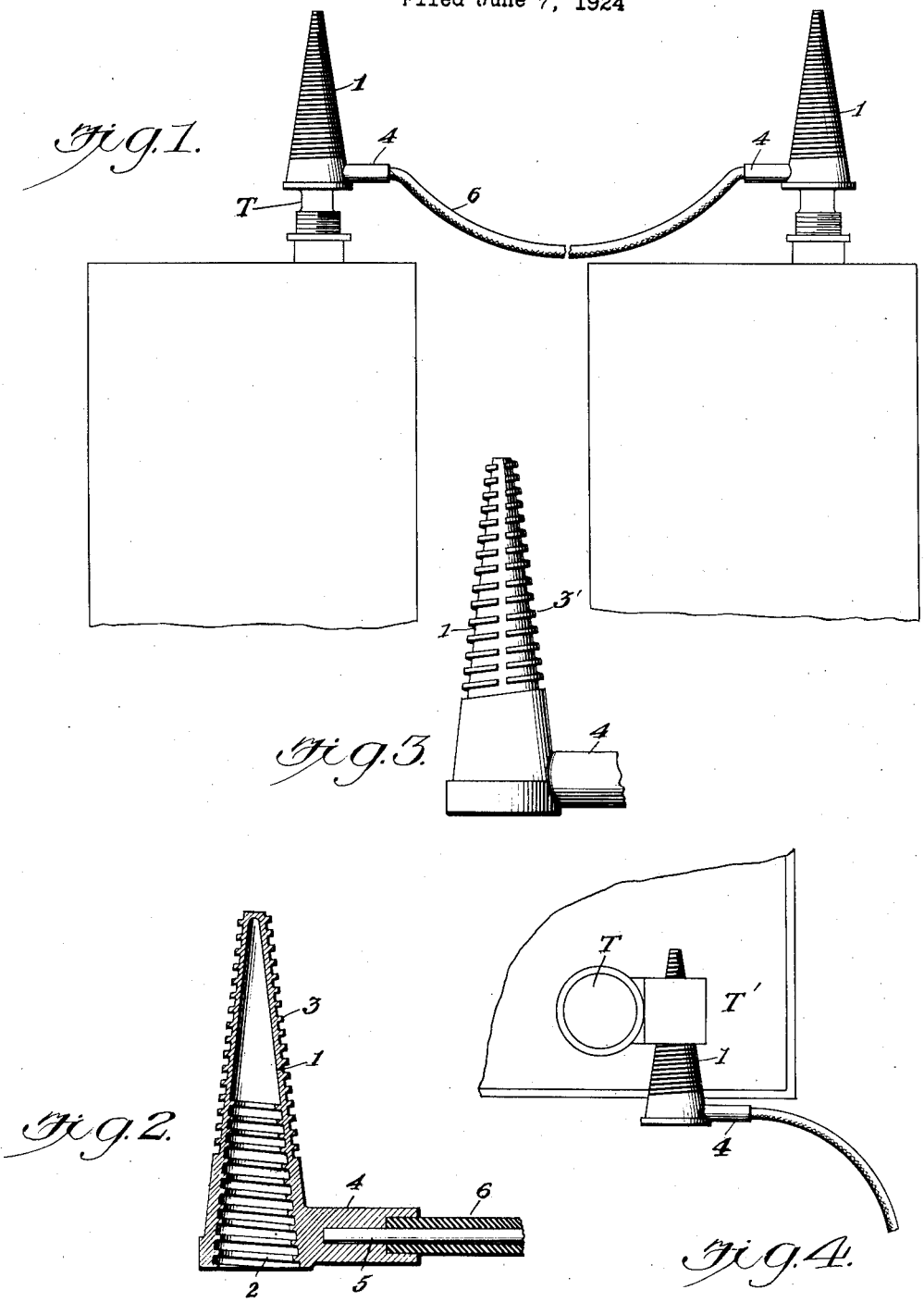

1,627,442

UNITED STATES PATENT OFFICE.

JOSEPH O. LUTHY, OF SAN ANTONIO, TEXAS.

BATTERY CONNECTER.

Application filed June 7, 1924. Serial No. 718,593.

The invention relates to a novel form of connecter, particularly adapted for quick and effective application to the terminals or conducting elements of storage batteries or other electrical apparatus, without the employment of auxiliary clamping or securing means, that will afford a firm and adequate electrical contact at all times and thereby reduce the chances of accidental displacement of the connection and will insure a minimum of electrical resistance between the connected parts. To these ends, the connecter per se comprises a hollow cap-like element having a converging interior wall structure provided with projections on the wall surface, the said interior wall structure preferably being conical in contour and the projections taking the form of screw threads on the surface. In its specific application, the connecter is made in the form of a hollow conical body having screw threads on its interior and exterior and provided with a conductor element attached or secured near the base of the conical body. When employed for battery charging or similar operations, two of the conical elements are employed with a suitable conductor, preferably flexible and insulated, connecting them together, all as will be hereinafter more particularly described, reference being made to the accompanying drawings, in which:

Fig. 1 is a side elevation of a double connecter applied to two secondary battery terminals.

Fig. 2 is an enlarged sectional elevation of a connecter element with an insulated conductor secured thereto.

Fig. 3 is an elevation of a modified form of a connecter.

Fig. 4 is a plan view showing another mode of securing the connecter to a different type of battery terminal.

Referring to the drawings, 1 indicates the body proper of the connecter element or unit, which is preferably formed as a hollow conical body, which may be conveniently formed as a casting of lead or lead alloy having the lower section of its tapering interior wall provided with screw threads or similar projections 2 extending from the base toward the tip. The lower portion of the exterior of the generally conical body is preferably reinforced with a peripheral flange and has extending laterally therefrom an integral socket member 4. The upper portion of the exterior surface is also preferably provided with screw threads 3 extending from the smooth lower portion of the body to the tip. As thus constructed, each connecter element comprises a relatively steep pitch, hollow cone, provided with interior and exterior screw threads, adapted to be engaged with a post or similar terminal by slipping the hollow cone over the latter and giving it one or two turns to cause the screw threads on the interior to bite into or bind with the surface of the terminal post or, in the alternative, may be engaged with a hollow or socketed terminal by inserting the conical body endwise into the hollow of the terminal and imparting a similar turn or twisting movement to the conical body.

In making up a complete connecter for general use, more particularly adapted for charging secondary batteries, two of the connecter elements, as hereinbefore described, are joined by an electrical conductor, preferably in the form of a conducting wire or cable 5, provided with suitable insulations 6, as more particularly shown in Figures 1 and 2. In order to produce a durable construction offering a minimum of electrical resistance, the conducting wire or cable 5 is preferably secured permanently and rigidly to each of the hollow conical members by inserting the ends of the conductor 5 into the molds in which the connecters proper are cast, so that the lugs or sockets 4 will be cast about the end of the conductor.

In some instances, it may be found desirable to interrupt or multilate the screw threads 2 and 3 formed on the interior and exterior of the hollow body, as shown in Figure 3, so that each of the end edges of the mutilated threads, which engages the surface of the battery connecter or other element, will tend to bite into the surface of the element and thereby insure a multiplicity of clean, effective contact surfaces.

As indicated, the connecter is adapted to be applied to a socketed terminal, clamp or other element, as illustrated in Figure 4, in which T represents the terminal post of a battery or other electrical element provided with the usual form of clamp having an eye or socket member T' adapted to receive the end of a connecter cable which is generally provided with a plug which passes through the eye T' and is drawn into firm contact with the interior thereof by means of a bolt which engages a screw thread on the projecting end of the plug. In applying the instant invention, the hollow terminal 1 of the connecter is inserted axially in the eye of the yoke member T' and given a partial turn which effectively locks the two members together by reason of the biting and wedging action of the screw threads on the terminal 1, which engage the interior of the eye.

In addition to the two modes of applying the connecter as shown, to wit, the interior engagement of the terminals 1 with the post members of battery terminals and the like, and the exterior engagement of the terminals 1 with socketed battery terminals or other elements, the connecter is also adapted for ready application by inserting the pointed end of one of the connecter terminals under the strap or connecter bar between separate cells of a battery and giving the terminal a twisting movement, which will have the effect of causing the screw threads on the exterior of the terminal to bite into the metal of the strap and also to wedge the terminal between the strap and the top of the cell. Should it be found desirable to employ a connection of greater length than would be afforded by the single connecter element as described, this may be effected by employing two or more of the connecters which are joined together by inserting the terminal of one connecter axially within the hollow of another connecter and applying the necessary rotary movement to cause the screw threads on the exterior of one to firmly engage the interior screw threads of the other, the free terminals of the chain of connecters being then employed for hooking up the separated batteries or other elements to be joined.

What I claim is:

A terminal for storage battery connecters comprising a conical shell having tapered inner walls and helical projections on the tapered interior and exterior walls.

In testimony whereof I affix my signature.

JOSEPH O. LUTHY.